United States Patent
Venkatapathy et al.

(10) Patent No.: US 12,430,633 B2
(45) Date of Patent: Sep. 30, 2025

(54) SYSTEMS AND METHODS FOR DISTRIBUTING DATA

(71) Applicant: MASTERCARD INTERNATIONAL INCORPORATED, Purchase, NY (US)

(72) Inventors: Ragunath Venkatapathy, O'Fallon, MO (US); Prasanna Srinivasan Narasimhan, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/220,246

(22) Filed: Jul. 10, 2023

(65) Prior Publication Data

US 2023/0360018 A1    Nov. 9, 2023

Related U.S. Application Data

(63) Continuation of application No. 17/003,644, filed on Aug. 26, 2020, now Pat. No. 11,699,141.

(51) Int. Cl.
| | |
|---|---|
| G06Q 20/02 | (2012.01) |
| G06Q 20/32 | (2012.01) |
| G06Q 20/40 | (2012.01) |

(52) U.S. Cl.
CPC ....... *G06Q 20/325* (2013.01); *G06Q 20/3223* (2013.01); *G06Q 20/4093* (2013.01)

(58) Field of Classification Search
CPC ............ G06Q 20/325; G06Q 20/3223; G06Q 20/4093; G06Q 20/42; G06Q 20/027
See application file for complete search history.

(56) References Cited

U.S. PATENT DOCUMENTS

| | | |
|---|---|---|
| 2002/0120763 A1 | 8/2002 | Miloushev et al. |
| 2012/0147894 A1 | 6/2012 | Mulligan et al. |

(Continued)

FOREIGN PATENT DOCUMENTS

| | | | |
|---|---|---|---|
| CN | 107092686 A | * 8/2017 | ............ G06F 16/13 |
| WO | WO02/069159 | 9/2002 | |

(Continued)

OTHER PUBLICATIONS

"An aggregatable name-based routing for energy-efficient data sharing in big data era", Ruidong Li, IEEE, Jun. 23, 2015 (Year: 2015).*

(Continued)

*Primary Examiner* — Duan Zhang
(74) *Attorney, Agent, or Firm* — Harness, Dickey & Pierce, P.L.C.

(57) ABSTRACT

Systems and methods are provided for distributing data to multiple data centers within a network based on unique information associated with the data. One example computer-implemented method includes receiving a request, from a service provider, for data stored at a data center and generating a group identifier based on the device ID specific to a device of a user. The method also includes identifying the data center based on the first group identifier and directing the request to the identified data center. The method then includes retrieving the data from the data center and returning the retrieved data to the service provider, in response to the request.

7 Claims, 3 Drawing Sheets

(56) References Cited

U.S. PATENT DOCUMENTS

| | | |
|---|---|---|
| 2013/0077486 A1 | 3/2013 | Keith |
| 2014/0229375 A1 | 8/2014 | Zaytzsev et al. |
| 2014/0258441 A1 | 9/2014 | L'Heureux et al. |
| 2015/0117298 A1* | 4/2015 | Hanatani ............... H04L 12/189 370/312 |
| 2018/0349644 A1 | 12/2018 | Lee et al. |
| 2019/0319808 A1* | 10/2019 | Fallah ................... H04L 9/3239 |
| 2022/0067693 A1 | 3/2022 | Venkatapathy et al. |
| 2023/0028555 A1* | 1/2023 | Cameron ............ H04L 63/0876 |

FOREIGN PATENT DOCUMENTS

| | | |
|---|---|---|
| WO | WO2017/117674 | 7/2017 |
| WO | WO2019/040047 | 2/2019 |

OTHER PUBLICATIONS

"How Akamai works in SAP cloud for Customers", Paul Luzardo, Jun. 10, 2019, https://blogs.sap.com/2019/06/10-akamai-works-in-sap-cloud-for-customer/; (Year:2019): 6 pgs.

\* cited by examiner

US 12,430,633 B2

SYSTEMS AND METHODS FOR DISTRIBUTING DATA

CROSS-REFERENCE TO RELATED APPLICATION

This application is a continuation of U.S. patent application Ser. No. 17/003,644 filed on Aug. 26, 2020. The entire disclosure of the above application is incorporated herein by reference.

FIELD

The present disclosure generally relates to systems and methods for distributing data, and in particular, to systems and methods for distributing data among multiple data centers based on unique information specific to the data, whereby the data is accessible at one of the multiple data centers based on the unique information, specific to the data, being included in requests for the data.

BACKGROUND

This section provides background information related to the present disclosure which is not necessarily prior art.

Networks often rely on data centers to store data associated with the networks. When the data is needed, then, requests are directed to the data centers for the desired data. The data is further known to be replicated from one data center to another, for example, for purposes of backup or disaster recovery. In such examples, the data is stored in a primary data center, and then replicated to a secondary data center. Here, requests for the data are generally directed to the primary data center, whereupon the primary data center responds to the requests with the requested data.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Data centers may be employed as repositories for data. In connection therewith, data may be replicated between multiple data centers to ensure the data within the data centers is the same. The replication may take time though, such as, for example, several minutes, whereby requests for the data directed to one data center may yield different results than requests for the same data directed to another data center. Consequently, it may be required to store the data in a primary data center, which is replicated to a secondary data center (e.g., for failure scenarios, etc.), and to restrict availability of the data to the primary data center to ensure up to date data is provided in response to the requests. This scheme, however, may be problematic in terms of infrastructure and scalability, depending on the number of requests for the data, regions to which the data centers are exposed, and/or the expected performance of the data centers.

Uniquely, the systems and methods herein provide for clustering of data, based on unique information, whereby related data is stored and accessible in a first data center (which is replicated to a second data center), while other data is stored and available in the second data center (which is replicated to the first data center). In particular, for transaction data, for example, as the transaction data is received, the data is segregated based on unique information included in and/or associated with the data (e.g., device IDs or IP addresses of user devices, etc.). The data is then directed, based on the segregation, to either the first data center or the second data center. In doing so, a relevant entity (e.g., an issuer of a payment account, etc.) is notified of the segregation and the unique information. The relevant entity may then request the data, when needed or desired, with the request including the unique information particular to the data, whereby the request is routed to the relevant or "primary" data center for the specific data (be it the first data center or the second data center). A response is compiled and transmitted, to the relevant entity, in response to the request. In this manner, multiple data centers are defined as "primary" data centers for certain data, and secondary data centers for other data, whereby capacity of the data centers, together, is enhanced over a single one of the data centers always being the primary data center.

Figure 1:
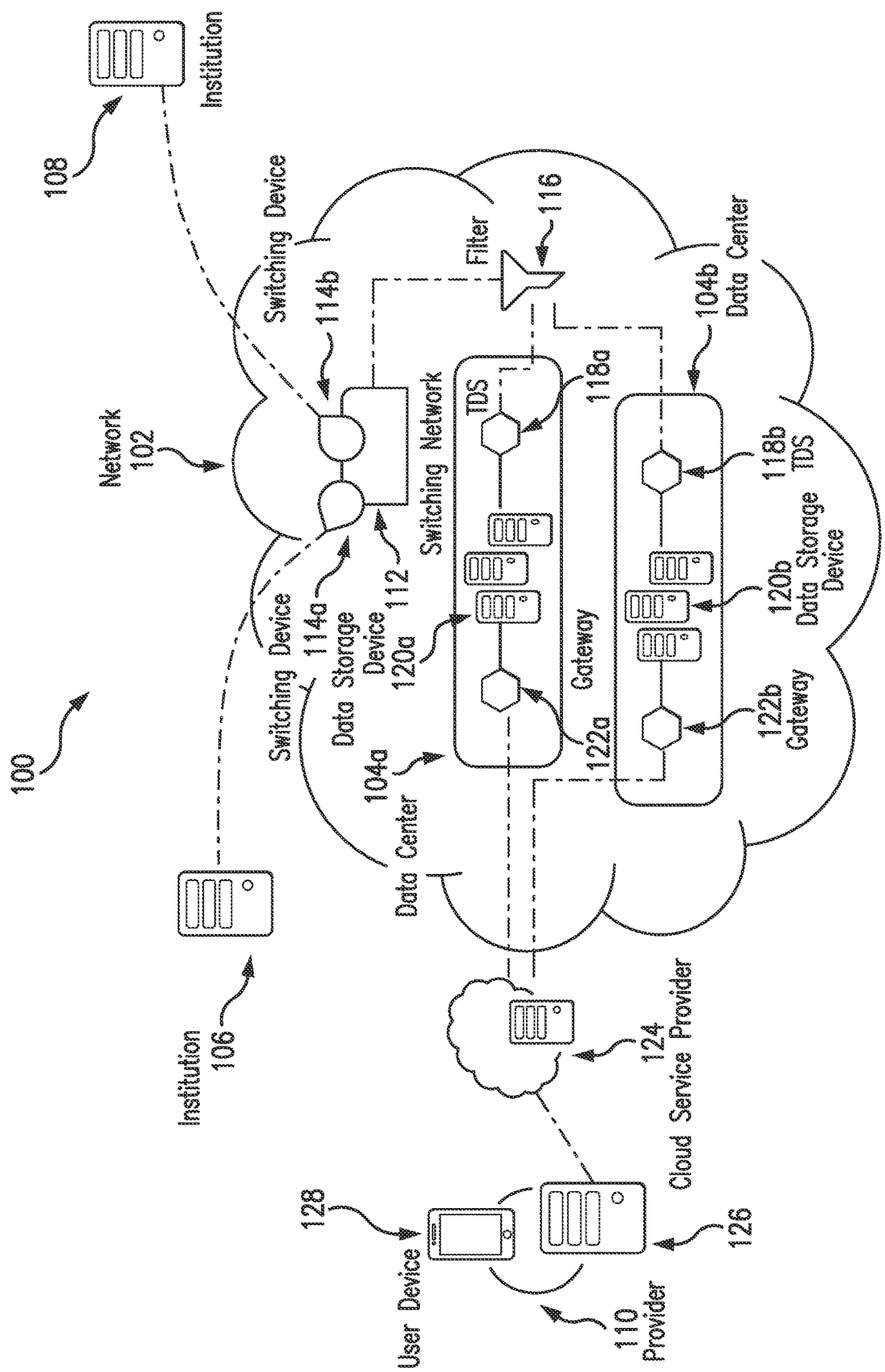
FIG. 1 is a block diagram of an example system of the present disclosure suitable for use in distributing data to multiple data centers based on unique information associated with the data, and then retrieving the data from the data centers as requested based on the unique information.

FIG. 1 illustrates an example system 100, in which one or more aspects of the present disclosure may be implemented. Although the system 100 is presented in one arrangement, other embodiments may include the parts of the system 100 (or other parts) arranged otherwise depending on, for example, distribution of data centers per region, types of data included in the system (and to be stored in data centers), regional limitations of data, volumes of data maintained in data centers, privacy and regulatory restrictions with regard to data, etc.

As shown in FIG. 1, the system 100 generally includes a network 102 having two data centers 104a-b, a first institution 106, a second instruction 108, and a provider 110. The first institution 106, the second institution 108, and the provider 110 are each coupled in communication (either directly or indirectly) with the network 102, as indicated by the dotted lines (e.g., via a local area network (LAN), a wide area network (WAN) (e.g., the Internet, etc.), a mobile network, a virtual network, and/or another suitable public and/or private network capable of supporting such communication, or any combination thereof; etc.).

In this example embodiment, the network 102 includes a payment network. In connection therewith, the network 102 includes a switching network 112, having multiple switching devices 114a-b coupled to the data centers 104a-b via filter 116. The switching network 112, in general, is configured to provide (e.g., receive, transmit, generate, process, etc.) routing of messages associated with institutions, such as, for example, the first institution 106 and the second institution 108, to and from the network 102. The switching devices 114a-b are generally geographically distributed to different customers and/or regions. In the example embodiment of FIG. 1, the switching device 114a is disposed at or near the first institution 106, and the switching device 114b is disposed at or near the second institution 108. In one or more examples, the switching devices 114a-b may include Mastercard® interface processors or MIPs, etc., but may be otherwise in other examples.

In addition, the network 102 includes the two data centers 104a-b, which are configured, in general, to store data associated with the network 102, for example, transaction data, etc. relating to the institutions 106 and 108 or other entities, etc. Two data centers 104a-b are included for purposes of illustration in FIG. 1, with it to be appreciated that the system 100 will generally include more than two such data centers. In connection therewith, the multiple data centers (including data centers 104a-b) then will generally be organized by region in the system 100, with the data centers disposed in multiple different regions (e.g., as defined by country boundaries, data privacy and/or transmission restrictions (e.g., data on-soil regulations, etc.), etc.), etc. In general, though, at least two of the data centers will often be available within a specific region (e.g., data centers 104a-b, etc.), into which transaction data (or other data) may be stored, as described in more detail below. Moreover, in this example embodiment, the data centers 104a-b further are configured as backups to one another, whereby each includes, subject to replication from a primary data center, duplicate data from the other data center. Specifically, for example, the data center 104a may be configured to originally store certain data, as described below (as the primary data center for such data), and to also replicate the data to the data center 104b, and vice versa. In this manner, subject to the delay associated with replication, if any, the data centers 104a-b are generally in sync and duplicates of one another.

The first institution 106 and the second institution 108 are, in this example embodiment, financial institutions, such as, for example, banks, etc. The first institution 106 and the second institution 108 each issues accounts to users or entities. In this example embodiment, the first institution 106 may be considered an acquirer, as the first institution 106 may be configured to issue accounts to merchants, through which the merchants receive funds for purchase transactions for products (e.g., goods, services, etc.). Similarly, the second institution 108 may be considered an issuer, as the second institution 108 may be configured to issue payment accounts (e.g., credit accounts, debit accounts, prepaid accounts, etc.) to users, through which the users are permitted to fund the purchase transactions with the merchants. It should be appreciated that the institutions 106 and 108 may be otherwise in other embodiments, and may further act in different roles, other than an acquirer and an issuer, in the present embodiment.

The provider 110 includes a service provider associated with the second institution 108. In this example embodiment, the provider 110 includes a virtual wallet or e-wallet provider for the second institution 108, whereby the provider 110 is configured to enable, host or provide wallet functionality to users associated with the second institution 108 (e.g., users having payment accounts issued by the second institution 108, etc.). The provider 110 includes, for example, as shown in FIG. 1, and as connected through the circled line, a backend platform 126 (broadly, a computing device) and/or a network-based application installed and active in a user device 128 associated with a user. The user device 128 may include, for example, a mobile device of a user (e.g., a smartphone, a tablet, a wearable device, etc.) or a non-mobile device associated with the user (e.g., an IoT device, etc.). In connection therewith, a token or other credential is associated with the payment account issued to the user (by the second institution 108), and the token or other credential is provisioned to the user device 128, or potentially, to a merchant platform (e.g., a website of the merchant which is accessible at the user device 128, etc.), etc.

Given the above, the user may initiate a purchase with a merchant (not shown) for a product, where the purchase is to be funded by the payment account issued by the second institution 108. In doing so, the token or other credential is provided to the merchant (e.g., via the user's virtual wallet as installed at or accessible by the user device 128, etc.). The merchant, in turn, is configured to compile and transmit an authorization request for the transaction. The request includes, among other things, transaction data such as (and without limitation) the token or other payment account credential for the user's payment account, an identification of the user, a transaction amount, a merchant name, a merchant ID, an acquirer ID, a transaction ID for the given transaction, etc., along with a device ID for the user device 128, an IP address, or other unique information specific to the user device 128, etc. The authorization request is then transmitted to the first institution 106, as the acquirer of the merchant. In turn, the first institution 106 is configured to transmit the authorization request to the network 102, and in particular, to the switching device 114a of the switching network 112 (as associated with the first institution 106).

Upon receipt of the authorization request, when the token is included, the network 102 is configured to map the token included in the authorization request to a primary account number (PAN) for the user's payment account. The PAN, then, is appended to (or otherwise included in) the authorization request (e.g., at the or by the switching device 114a, or at the or by the switching network 112 in general, etc.), and the switching device 114a routes the modified authorization request to the switching device 114b. And, the switching device 114b is configured to transmit the authorization request to the second institution 108. Upon receipt of the request, the second institution 108 is configured to determine whether to approve or decline the transaction, and to compile an authorization reply including the determination. The second institution 108 then transmits the authorization reply to the network 102, and in particular, to the switching device 114b (as associated with the second institution 108). The switching device 114b is configured to route the authorization reply to the switching device 114a, which is configured to replace the PAN with the token (when the authorization request originally include the token) and transmit the authorization reply to the first institution 106. The first institution 106 is configured, in turn, to return the authorization reply to the merchant, thereby permitting the merchant to proceed in the transaction (when approved) or to cancel the transaction or seek alternate funding (when decline) consistent with the determination of the second institution 108 (as included in the authorization reply).

In connection with the above example transaction, the authorization messaging (including both the authorization request and authorization reply), and more specifically, the transaction data included therein, is stored in one of the data centers 104a-b. In particular, the switching network 112 is configured to pass the transaction data from the authorization messaging (upon receipt of the messaging from the first institution 106 and/or the second intuition 108 by the corresponding switching device 114*a* and/or 114*b*) to the transaction filter 116. The transaction filter 116 is configured, in turn, to employ an algorithm based on the device ID of the user device 128 (used in the underlying transaction identified in the messaging routed to the filter 116) (or other ID linked to the user such as the PAN for the user's payment account, the IP address associated with the transaction, etc.) and a transaction ID for the underlying transaction (or other ID linked to the transaction, such as a transaction amount, date, combination thereof, etc.), for example, to generate a group identifier for the data. For instance, for transaction data for the given transaction, the filter 116 may employ one or more hashing algorithms (alone or in combination) (e.g., a MD5 hash function, a SHA cryptographic hash function (e.g., SHA-0, SHA-1, SHA-2, etc.), etc.), using the device ID of the user device 128 and the transaction ID of the transaction as input, to generate the group identifier. The group identifier, then, in the example system 100 (where there are only two data centers 104*a-b*), is indicative of either group one (e.g., a first group, etc.) or group two (e.g., a second group, etc.), whereby the group one identifier is associated with the data center 104*a* and the group two identifier is associated with the data center 104*b*.

Consequently, when the filter 116 generates a group one identifier, the filter 116 is configured to identify the data center 104*a* and route the transaction data to the data center 104*a*. And, when the filter 116 generates a group two identifier, the filter 116 is configured to identify the data center 104*b* and route the transaction data to the data center 104*b*. It should be appreciated that when the network 102 includes a different number of data centers (e.g., three, four, ten, one hundred, etc.) the filter 116 is configured to generate a group identifier to segregate the transaction data among the available data centers, whether within a specific region or not. In such embodiments, the hashing algorithm(s) used to generate the group identifier may further be configured to utilize a number of available data centers as an input, etc.

With continued reference to FIG. 1, each of the data centers 104*a-b* includes a respective transaction detail server (TDS) 118*a-b* and data storage device 120*a-b*. The data storage devices 120*a-b* may each include any suitable memory hardware to accommodate the data stored therein. In addition, the data storage devices 120*a-b* may each include a cluster of physical servers or other suitable devices, or may include, in various embodiments, cloud storage, etc. Each TDS 118*a-b* is configured to generate a notification (in response to receiving the data at the corresponding one of the data centers 104*a-b*), which includes details of the transaction (and, in some examples, the group identifier for the transaction data), and to transmit the notification to the provider 110. The provider 110 (and thus the user's virtual wallet) is identified, by each TDS 118*a-b*, based on the device ID for the user device 128 included in the transaction data directed to the respective data center 104*a-b*. Each TDS 118*a-b* is further configured to store the transaction data (as received from the filter 116), along with the assigned group identifier, in the respective data storage device 120*a-b*. In this manner, transaction data is segregated between the first data center 104*a* and the second data center 104*b*, based on the group identifier, and the provider 110 is in turn informed of the group identifier (and, thus, the data center at which the transaction data is primarily stored). What's more, because the segregation is based (at least in part) on the device ID of the user device 128, for example (or, potentially in other embodiments, on some other data specific to the provider 110 and/or the user device 128), each transaction associated with the user's virtual wallet will be segregated for storage in the same data center (and identified back to the provider 110 and/or user device 128).

Further in the system 100, each of the data centers 104*a-b* includes a respective gateway 122*a-b*. Each gateway 122*a-b* is configured to expose an application programming interface (API) and to receive, via an API call, a request for transaction data. Conversely, when certain transaction data is needed, the provider 110 is configured to call the API associated with the respective gateway 122*a-b*, where the API call (broadly, the request) is generally based on the group identifier associated with the requested data. It should be appreciated that the API call may be exposed through a cloud service provider 124 (e.g., Akamai, etc.), whereby the cloud service provider 124 is configured to generate the group identifier for the requested data in the same manner utilized by the filter 116 (and described above), and then direct the API call to one of the gateway 122*a* or the gateway 122*b* based on the group identifier (thereby providing consistency in the generation of the group identifier such that the group identifier may be accurately used to locate the corresponding data).

While each of the gateways 122*a-b* is configured to expose an API in this embodiment, it should be appreciated that a request for transaction data (by the provider 110, for example) may be in a different form in other embodiments (e.g., an email, etc.). It should further be appreciated that, in managing such requests, a server may be employed in place of the cloud service provider 124, where the server is included in the network 102, for example, and configured, in turn, to receive the request from the provider 110 and to route the request to the appropriate data center 104*a-b*.

Upon receipt of the API call, or other request, the appropriate gateway 122*a-b* is configured to, either directly or via communication with the TDS 118*a-b* (e.g., via an API call to the TDS 118*a-b* based on an API exposed by the TDS 118*a-b*, etc.), retrieve the transaction data from the corresponding data storage device 120*a-b*, in the respective data center 104*a-b*, and to return the data to the provider 110, directly or via the cloud service provider 124 (or via a server). The provider 110 is configured to receive the transaction data from the respective data center 104*a-b*, directly or via the cloud service provider 124 (or other server), and to serve up the transaction data for one or more purposes to the user (e.g., at the user device 128, etc.) and/or services dependent on the transaction data, etc.

While only one network 102, two data centers 104*a-b*, two institutions 106, 108, one provider 110, and one cloud service provider 124 are illustrated in FIG. 1 (for ease of illustration), it should be appreciated that the system 100 may include any desired number of such parts, parties, or devices within the scope of the present disclosure. In general, for example, the system 100 will often include many institutions and providers and data centers, etc.

Figure 2:
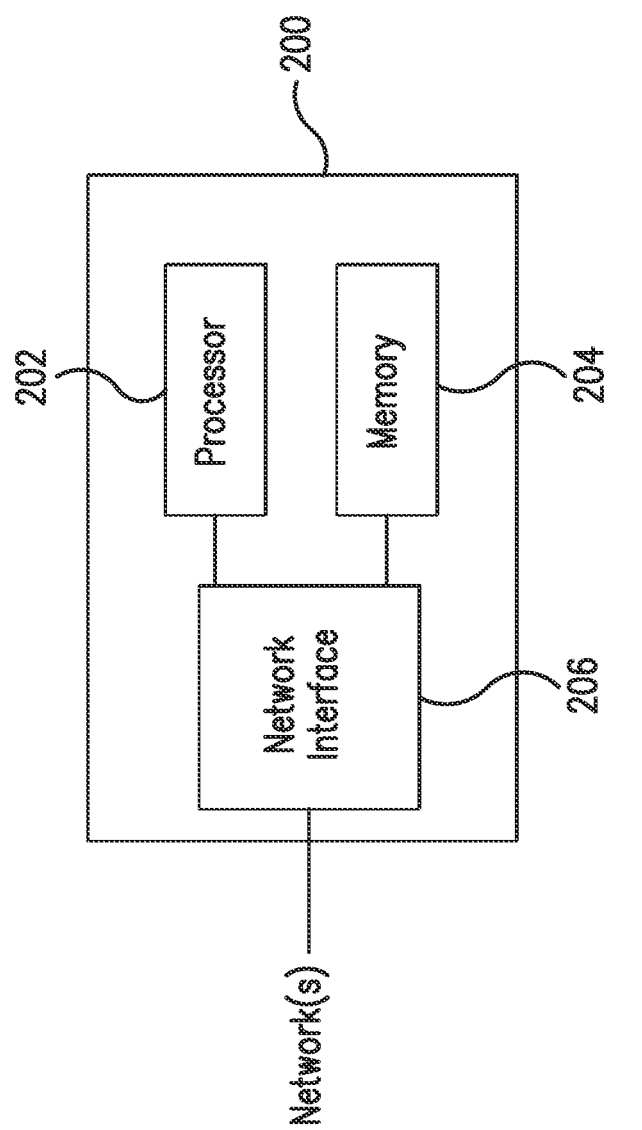
FIG. 2 is a block diagram of a computing device that may be used in the example system of FIG. 1.

FIG. 2 illustrates an example computing device 200 that can be used in the system 100. The computing device 200 may include, for example, one or more servers, workstations, computers, laptops, tablets, smartphones, or any other suitable physical or virtual machine, etc. In addition, the computing device 200 may include a single computing device, or it may include multiple computing devices located in close proximity or distributed over a geographic region, so long as the computing devices are configured to function as described herein. In the system 100, each of the institutions 106 and 108, the provider 110, the switching devices 114*a-b*, the filter 116, the TDSs 118*a-b*, and the gateways 122*a-b* may include, or may be implemented in, a computing device consistent with computing device 200. The data storage devices 120*a*-*b* and the cloud service provider 124 may further be considered computing devices at least partially consistent with the computing device 200. In connection therewith, each is then coupled to, and is in communication with, one or more networks interconnecting these parts of the system 100. However, the system 100 should not be considered to be limited to the computing device 200, as described below, as different computing devices and/or arrangements of computing devices may be used. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a programmable gate array (e.g., a field programmable gate array (FPGA), etc.), a system on chip (SOC), and/or any other circuit or processor capable of the operations described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, group identifiers, device IDs, IP addresses, and/or other types of data (and/or data structures) suitable for use as described herein. Furthermore, in various embodiments, computer-executable instructions, i.e., software instructions, may be stored in the memory 204 for execution by the processor 202 to cause the processor 202 to perform one or more of the operations described herein (e.g., one or more of the operations of method 300, etc.), such that the memory 204 is a physical, tangible, and non-transitory computer readable storage media. Such instructions often improve the efficiencies and/or performance of the processor 202 that is performing one or more of the various operations herein, such that the computing device 200, in performing the operations, is effectively transformed into a special purpose computing device. In addition, one or more load files may be stored in memory 204, which include hardware descriptions that, when loaded to the processor 202 (or another processor), cause the processor 202 to be structured consistent with the descriptions herein (e.g., descriptions of gate array arrangements/configurations, etc.).

Further, the illustrated computing device 200 also includes a network interface 206 coupled to (and in communication with) the processor 202 (and/or the memory 204) and configured to provide communication and/or coupling to one or more networks. The one or more networks (as noted above) may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. Consistent therewith, the network interface 206 may include, without limitation, a wired network adapter, a wireless network adapter, a mobile network adapter, or other device capable of communicating to/with the one or more different networks, for example, as included in the system 100. In some example embodiments, the computing device 200 includes the processor 202 and one or more network interfaces 206 incorporated into or with the processor 202.

Figure 3:
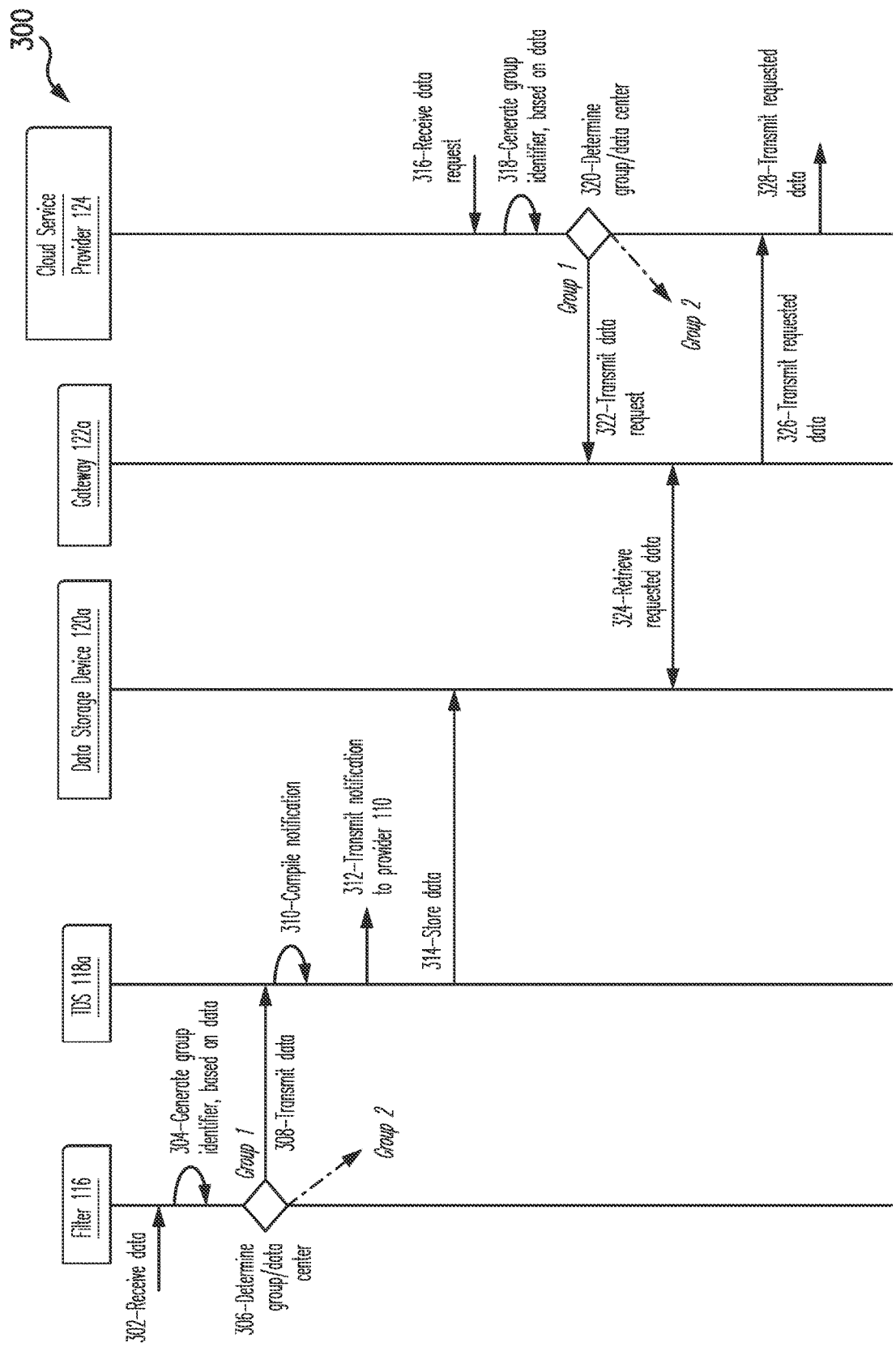
FIG. 3 is an example method, which may be implemented in connection with the system of FIG. 1, for distributing data to multiple data centers based on unique information associated with the data, and then later retrieving the data from the data centers based on the unique information.

FIG. 3 illustrates an example method 300 for use in distributing data to multiple data centers based on unique information associated with the data, and then later, retrieving the data based on the unique information. The method 300 is described with reference to the system 100, and in particular, the network 102 and the data centers 104*a*-*b* thereof, and also with reference to the computing device 200. While described in this manner, however, it should be appreciated that the methods herein are not limited to the system 100 and/or the computing device 200. Likewise, it should also be appreciated that the systems and methods herein should not be understood to be limited to the method 300.

Consistent with the above, it should be appreciated that a user is associated with a payment account that is issued by the institution 108, and that the payment account is provisioned to a virtual wallet application and/or service associated with the provider 110 and identified to the user device 128. As such, in this example, when the user initiates a transaction with the payment account, via the virtual wallet, the authorization request for the transaction (as generated by a merchant involved in the transaction) includes a device ID for the user device 128 and a transaction ID for the transaction, as described above.

Upon receiving the authorization request (or, potentially, upon receiving the corresponding authorization reply), the switching network 112 of the network 102 transmits or publishes the authorization request (or authorization reply) (broadly, the authorization message) or, more generally, the transaction data for the transaction, to the filter 116. In turn, the filter 116 receives, at 302, the transaction data. As explained above, the transaction data includes the device ID for the user device 128, which may include, for example, an IP address, an electronic identification number (EIN), an electronic serial number (ESN), a media access control (MAC) address, etc. for (or associated with) the user device 128, as well as a transaction ID for the transaction performed by the user at the merchant.

In turn, at 304, the filter 116 generates a group identifier for the transaction based on the transaction data, and in particular, based on the device ID for the user device 128, the transaction ID for the transaction, and one or more algorithms, etc. Specifically, the filter 116 may employ an algorithm based on the device ID of the user device 128 (used in the underlying transaction identified in the messaging routed to the filter 116) and a transaction ID for the underlying transaction, for example, to generate the group identifier for the transaction. As generally described above, the filter 116 may employ, for instance, one or more hashing algorithms (alone or in combination) (e.g., a MD5 hash function, a SHA cryptographic hash function (e.g., SHA-0, SHA-1, SHA-2, etc.), etc.), using the device ID of the user device 128 and the transaction ID of the transaction as input, to generate the group identifier. That said, it should be appreciated that the filter 116 may generate the group identifier based on any suitable techniques, and that the particular technique(s) utilized may be dependent on the number and/or arrangement of available data centers for storing data, and/or the type of data to be stored, the particular locations of the data centers, etc. In the example system 100 illustrated in FIG. 1, for example, in which two data centers 104*a-b* are illustrated, a generally simple technique may be used to generate the group identifier such as, for instance, a determination of whether a last digit of the device ID is odd or even. However, as additional data centers are added to (and organized in) different regions and/or are provided in different hierarchical layers (and/or involve storage of different data, etc.), more sophisticated techniques may be required to accommodate the more complex arrangement of the numerous data centers (to enable generation of a unique group identifier for each of the different data centers).

In any case, once the group identifier is generated, the filter 116 determines, at 306, whether the group identifier is indicative of group one (in this example embodiment, the data center 104*a*, i.e., the TDS 118*a*, the data storage device 120*a*, and the gateway 122*a*) or group two (in this example embodiment, the data center 104*b*, i.e., the TDS 118*b*, the data storage device 120*b*, and the gateway 122*b*). In this example, the filter 116 determines the group identifier is associated with or indicative of group one, whereby the filter transmits, at 308, the transaction data (and the group identifier) to the TDS 118*a*, and more generally, the data center 104*a*. Alternatively, as indicated by the dotted line in FIG. 3, if the filter 116 determines the group identifier is associated with or indicative of group two, the filter 116 would have transmitted the transaction data to the data center 104*b* (whereby a description of the flow of data would be substantially the same as described next, but with regard to the data center 104*a*).

In turn, the TDS 118*a* receives the transaction data and compiles, at 310, a notification for the user and/or the provider 110 indicative of the assigned group. Specifically, the TDS 118*a* identifies the user device 128, or more generally, the provider 110, based on the device ID included in the transaction data and/or based on other data therein (e.g., a PAN for the user's payment account, etc.). The notification is compiled to include details of the transaction, such as, for example, the transaction amount, merchant name for the merchant involved in the transaction, transaction ID, etc., as included in the transaction data (e.g., as included in a header or actual body of the transaction, etc.). The notification may optionally further be compiled to include the group identifier. The TDS 118*a* then transmits, at 312, the notification to the provider 110 for delivery to the user device 128 (for provision to the user, etc.). In connection therewith, the provider 110 may display (e.g., at the user device 128, etc.) or otherwise inform the user of the transaction data.

Additionally, the TDS 118*a* also stores, at 314, the received transaction data, or parts thereof, in the data storage device 120*a*.

Thereafter in the method 300, the provider 110, and more specifically the user, via the user device 128 (through the provider 110), may desire to access transaction data associated with his/her payment account for one or more reasons, such as, for example, reporting, reviewing, etc. In connection therewith, the provider 110 provides a data request to the cloud service provider 124, for example, as an API request or other suitable request. The data request includes the same device ID (for the user device 128), which was included in the transaction data for the above transaction, as well as a transaction ID for the transaction involving the requested transaction data (or, potentially, some other identification for the requested data such as a date, merchant ID, etc.).

Consequently, the cloud service provider 124 receives the data request, at 316, and generates a group identifier for the data request based on the device ID, transaction ID for the transaction associated with the data (e.g., as included in the header or body of the transaction identified in the data request, etc.), and/or other data included in the request, in a manner consistent with step 304 above (as performed by the filter 116) (i.e., thereby yielding the same group identifier). While the group identifier is generated again in this example embodiment, it should be appreciated that the group identifier may be included in the data request in other method embodiments (based on the TDS 118*a* providing the group identifier to the provider 110 as part of the notification at 312, etc.), whereby the generating step (at 318) may be omitted. Regardless, the cloud service provider 124, in turn, determines, at 320, whether the group identifier generated by the cloud service provider 124 or included in the data request is indicative of group one (i.e., data center 104*a* in this example) or group two (i.e., data center 104*b* in this example). In this example, the cloud service provider 124 determines the group identifier is associated with or indicative of group one, whereby the cloud service provider 124 transmits, at 322, the request for the transaction data (and the group identifier) to the gateway 122*a*, and more generally, to the data center 104*a*. Alternatively, as indicated by the dotted line, had the cloud service provider 124 determined the group identifier to be associated with or indicative of group two, the cloud service provider 124 would have instead transmitted the transaction data to the data center 104*b*.

Then in the method 300, upon receipt of the data request, the gateway 122*a* retrieves the requested data from the data storage device 120*a*, at 324, based on particular information included in the data request (e.g., the transaction ID, a merchant name or other identifier, etc.). In doing so, the gateway 122*a* may directly retrieve the requested data from the data storage device 120*a*. Or, the gateway 122*a* may call an API exposed by the TDS 118*a*, whereby the TDS 118*a* retrieves the requested data and returns the same to the gateway 122*a*. In either case, the gateway 122*a* then transmits, at 326, the requested data, as retrieved in response to the data request, to the cloud service provider 124. The cloud services provider 124, in turn, transmits the requested data, at 328, back to the provider 110. At that point, the requested data may be displayed to the user, for example, at the user device 128, or otherwise used consistent with the purposes of requesting the data.

In view of the above, the systems and methods herein may provide for segregation of data, such as, for example, transaction data, etc., between multiple data centers of a network, whereby providers associated with the data are notified of the particular ones of the multiple data centers into which the data has been segregated. Consequently, the providers are enabled to request the data from the specific data centers (e.g., by inclusion of particular groups or data center identifiers, etc.), whereby requests for the data are routed to the appropriate data centers and multiple data centers are permitted to operate in parallel in responding to data requests from providers.

More generally, the systems and methods herein permit data to be clustered based on specific unique information ciphered through one or more algorithmic techniques, whereby devices are permitted to identify data centers specific to the data and then to route the data to specific data centers in the network. The segregation of data to the different data centers may be implemented to attain efficient routing on different hierarchy layers of the network (e.g., at the application layer versus the data layer, etc.) within regional and across regional data centers for high availability. In this manner, the systems and methods herein provide for scalable and functional infrastructure (i.e., distributed data centers, which may include various data centers segregated by region, or not), and availability zones and regions as needed to provide data access to providers and/or to provide application development by the providers, for example, seamlessly and with high availability. As such, the systems and methods herein are able to be implemented across various API-based or other suitable applications associated with providers or institutions, for example, that require distributed processing without need to connect to one central database.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code and/or load files (prior to implementation in hardware) in the form of instructions or data structures and that can be accessed by a processor, and/or implemented in hardware. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing one or more of: (a) receiving data including a device ID specific to a device of a user and associated with a provider; (b) generating, by a filter computing device, a group identifier for the received data based on the device ID, the group identifier associated with only one of multiple data centers within a network; (c) storing the received data in a data storage device of the one of the multiple data centers based on the group identifier; (d) compiling, by a transaction detail server (TDS) of the one of the multiple data centers, a notification related to the received data for the user associated with the device; (e) transmitting the notification, based on the device ID, to the provider and/or to the device for presentation to the user; (f) receiving, by a cloud service provider, a request, from the provider, for at least a portion of the data stored in the data storage device of the one of the multiple data centers, the request including the device ID specific to the device associated with the provider; (g) generating, by the cloud services provider, a group identifier based on the device ID, the group identifier associated with the one of multiple data centers within the network; (h) retrieving, by a gateway computing device of the one of the multiple data centers, the at least a portion of the data from the data storage device of the one of the multiple data centers; (i) transmitting, by the gateway computing device, the retrieved at least a portion of the data to the cloud service provider; (j) returning, by the cloud server provider, the retrieved at least a portion of the data to the provider, in response to the request; (k) identifying the one of the multiple data centers within the network based on the group identifier; and (l) transmitting, by the filter computing device, the received data to the data storage device of the one of the multiple data centers for storing.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Specific values described herein are example in nature and do not limit the scope of the present disclosure. The disclosure herein of such particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in distributing data to multiple data centers within a network based on unique information associated with the data, the method comprising:
  receiving, by a filter computing device, data including a device identifier specific to a device of a user;
  hashing, by the filter computing device, based on a hash function, the device identifier to generate a first group identifier for the received data, the first group identifier indicative of only one of multiple data centers;
  storing the received data in a data storage device of one of the multiple data centers, based on the first group identifier being specific to the one of the multiple data centers; and then
  receiving, by a cloud service provider server, from a service provider, which is distinct from the cloud service provider and the network, a request for at least a portion of the data stored in the data storage device of the one of the multiple data centers, the request including the device identifier; and
  in response to the request:
    hashing, by the cloud service provider server, based on the hash function, the device identifier to generate the first group identifier;
    directing the request to said one of the multiple data centers, based on the first group identifier being specific to the one of the multiple data centers; and then,
    retrieving, by the one of the multiple data centers, the at least a portion of the data from the data storage device of the one of the multiple data centers;
    transmitting, by the one of the multiple data centers, the retrieved at least a portion of the data to the cloud service provider server; and
    returning, by the cloud service provider server, the retrieved at least a portion of the data to the service provider, in response to the request.

2. The computer-implemented method of claim 1, wherein the device identifier includes one of an IP address, a media access control (MAC) address, and an electronic serial number (ESN) of the device associated with the user; and
  wherein the device is a personal user device of the user.

3. The computer-implemented method of claim 1, further comprising:
  compiling, by a transaction detail server (TDS) of the one of the multiple data centers, a notification related to the received data for the user associated with the device; and
  transmitting the notification, based on the device identifier, to the service.

4. The computer-implemented method of claim 1, further comprising:
  transmitting, by the filter computing device, the received data to the data storage device of the identified one of the multiple data centers, whereby the data is stored in the data storage device.

5. A system for use in distributing data, the system comprising:
  a network including multiple data centers, a filter computing device, and a switching network, which is configured to route network messaging between different institutions;
  a cloud service provider server coupled in communication with the network;
  wherein the filter computing device is configured to:
    receive, from the switching network, data included in a network message for a network transaction involving a user, the data including a device identifier specific to a device of a user involved in the network transaction;
    hash, based on a hash function, the device identifier to generate a first group identifier for the received data;
    store the received data in a data storage device of one of the multiple data centers based on the first group identifier being specific to the one of the multiple data centers; and
  wherein the cloud service provider server is configured to:
    receive, from a service provider, which is distinct from the cloud service provider server, a request for at least a portion of the data stored in one of the multiple data centers of the network, the request including the device identifier specific to the device of the user; and
    in response to the request:
      hash, based on the hash function, the device identifier to generate the first group identifier; and
      direct the request to said one of the multiple data centers, based on the first group identifier being specific to the one of the multiple data centers; and
  wherein the one of the multiple data centers is configured to:
    receive the request from the cloud service provider server;
    retrieve the at least a portion of the data stored in the one of the multiple data centers; and
    transmit the retrieved at least a portion of the data to the cloud service provider server; and
  wherein the cloud service provider server is configured to return the retrieved at least a portion of the data to the service provider.

6. The system of claim 5, wherein the device identifier includes one of an IP address, a media access control (MAC) address, and an electronic serial number (ESN) of the device; and wherein the device is a personal user device of the user.

7. The system of claim 5, wherein the one of the multiple data centers includes a transaction detail server configured, in response to the received data being stored in the data storage device of the identified one of the multiple data centers, to:

compile a notification related to the received data; and transmit the notification, based on the device identifier, to the device of the user for presentation to the user and/or to a backend platform computing device for presentation to the user at the device.

* * * * *